Nov. 23, 1937.    L. C. EBERLE    2,100,001
LEADER BRACKET
Filed Nov. 20, 1936
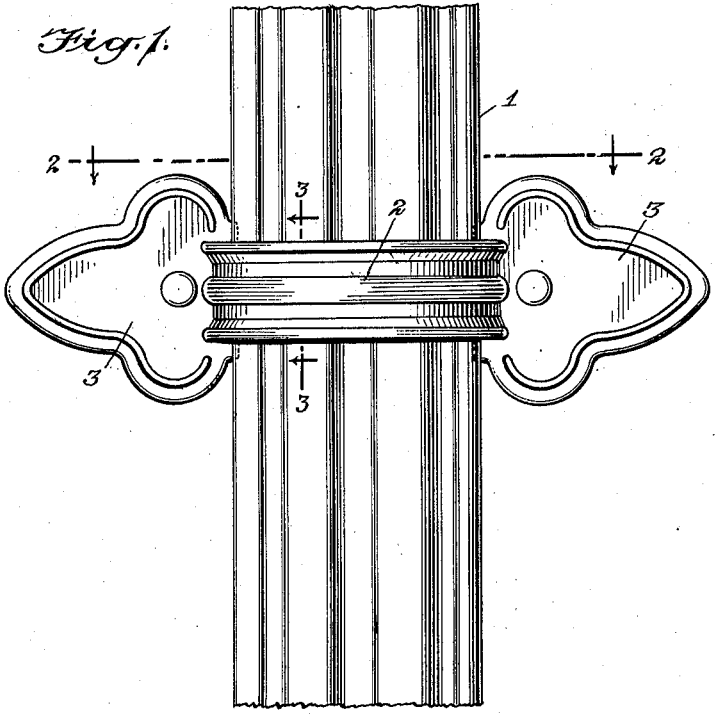
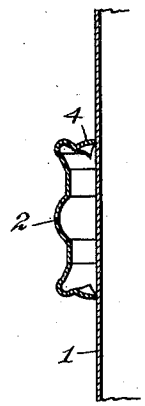
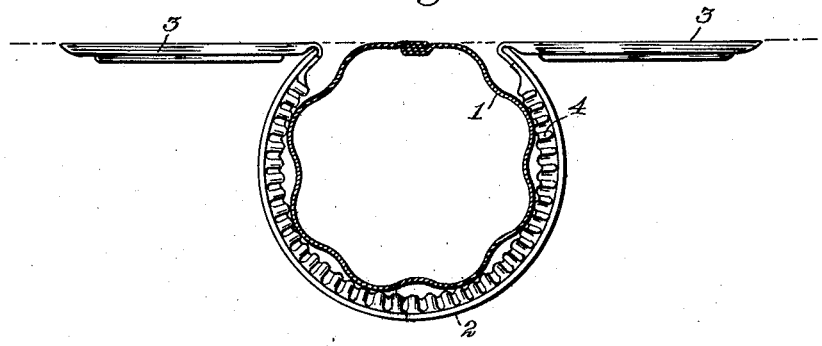
WITNESSES
INVENTOR
Louis C. Eberle
BY
Munn, Anderson & Liddy
ATTORNEYS Patented Nov. 23, 1937

2,100,001

UNITED STATES PATENT OFFICE 2,100,001

LEADER BRACKET

Louis C. Eberle, Roselle Park, N. J., assignor of one-half to Gustave Eberle, Roselle Park, N. J.

Application November 20, 1936, Serial No. 111,919

2 Claims. (Cl. 248—74)

This invention relates to leader brackets, an object of the invention being to provide a neat and ornamental bracket which will bitingly engage the leader and prevent movement of the leader in any direction.

Another object is to provide a bracket of this character which will be manufactured and sold at a reasonably low price, and which will most efficiently perform the functions for which it is intended.

With these and other objects in view, the invention consists in certain novel features of construction and combinations and arrangements of parts, all of which will be more fully hereinafter described and pointed out in the claims.

In the accompanying drawing—

Fig. 1 is a view in elevation illustrating my improved leader bracket in operative position on a leader;

Fig. 2 is a view in transverse section on the line 2—2 of Fig. 1; and

Fig. 3 is an enlarged fragmentary view in section on the line 3—3 of Fig. 1.

1 represents a leader pipe or leader as it is commonly known in the art, and while of course my invention is especially adapted for use on pipes of this character it is well within the scope of this invention to utilize the same in connection with various types of pipes.

My improved leader bracket comprises a metal strap 2 adapted to partially encircle the leader 1, and having at its ends integral wall-engaging feet 3 to hold the bracket in place. The strap 2 is provided at its edges with inwardly projecting flanges 4, and these flanges are corrugated presenting fluted or serrated edges which bitingly engage the leader and prevent movement of the latter in any direction.

The bracket may of course be variously shaped transversely thereof for strength and for attractiveness of design, and it will be noted that when the strap 2 is located around the leader, there will be ample space under the bracket to accommodate an ordinary leader hook. In other words, the bracket may be secured over the ordinary leader hook or be used independently thereof.

I have illustrated a leader of general corrugated form, but it is of course understood that leader pipes are made of various shapes in cross section, some being cylindrical, some rectangular, while others are differently shaped, and it is well within the scope of my invention to so shape the strap 2, which partially encircles the leader, as to substantially conform to the transverse sectional shape of the leader.

While I have illustrated and described what I believe to be the preferred embodiment of my invention, it is obvious that various slight changes may be made with regard to the form and arrangement of parts without departing from my invention, and hence I do not limit myself to the precise details set forth but consider myself at liberty to make such changes and alterations as fairly fall within the spirit and scope of the claims.

I claim:

1. A leader bracket, including a metal strap adapted to partially encircle a leader, and inwardly projecting corrugated flanges at the edges of the strap adapted to bitingly engage the leader.

2. A leader bracket, including a metal strap adapted to partially encircle a pipe, wall-engaging feet at the ends of the strap and integral therewith, and inwardly projecting flanges at the edges of the strap, said flanges having fluted edges adapted to bitingly engage the pipe.

LOUIS C. EBERLE.